United States Patent
Arsovski et al.

(10) Patent No.: US 9,501,607 B1
(45) Date of Patent: Nov. 22, 2016

(54) COMPOSITE VIEWS FOR IP BLOCKS IN ASIC DESIGNS

(71) Applicant: INTERNATIONAL BUSINESS MACHINES CORPORATION, Armonk, NY (US)

(72) Inventors: Igor Arsovski, Williston, VT (US); Mark W. Kuemerle, Essex Junction, VT (US); Qing Li, Shanghai (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/734,411

(22) Filed: Jun. 9, 2015

(51) Int. Cl.
  *G06F 17/50* (2006.01)
  *G06F 15/04* (2006.01)

(52) U.S. Cl.
  CPC ....... *G06F 17/5081* (2013.01); *G06F 17/5027* (2013.01); *G06F 17/5031* (2013.01); *G06F 17/5077* (2013.01)

(58) Field of Classification Search
  CPC .................. G06F 17/5054; G06F 17/5068
  USPC ................................................. 716/138, 139
  See application file for complete search history.

(56) References Cited

U.S. PATENT DOCUMENTS

| | | | |
|---|---|---|---|
| 5,544,067 A * | 8/1996 | Rostoker | G01R 31/31704 703/14 |
| 6,536,028 B1 | 3/2003 | Katsioulas et al. | |
| 7,058,862 B2 | 6/2006 | Whetsel et al. | |
| 7,203,918 B2 | 4/2007 | Wei et al. | |
| 7,308,668 B2 | 12/2007 | Bueti et al. | |
| 7,735,042 B2 | 6/2010 | Gray et al. | |
| 8,117,661 B2 | 2/2012 | Zhang | |
| 8,141,015 B1 * | 3/2012 | Govig | G06F 17/5031 716/108 |
| 8,479,150 B2 * | 7/2013 | Grechanik | G06F 8/34 703/16 |
| 8,614,732 B2 | 12/2013 | Baird et al. | |
| 8,645,897 B1 | 2/2014 | Nandini et al. | |
| 8,745,561 B1 * | 6/2014 | Garg | G06F 17/5031 703/16 |
| 2003/0149669 A1 | 8/2003 | Howells et al. | |
| 2005/0138580 A1 | 6/2005 | Lim et al. | |

(Continued)

FOREIGN PATENT DOCUMENTS

| JP | 2006202140 A | 8/2006 |
|---|---|---|
| KR | 1020040057043 A | 7/2004 |

OTHER PUBLICATIONS

Gopisetty et al., "Methodology for process portable hard IP block creation using cell based array architecture", ASIC Conference 1998 Proceedings Eleventh Annual IEEE International, Sep. 13-16, 1998, pp. 271-275, Rochester New York.

(Continued)

*Primary Examiner* — Suresh Memula
(74) *Attorney, Agent, or Firm* — David Cain; Andrew M. Calderon; Roberts Mlotkowski Safran Cole & Calderon, P.C.

(57) ABSTRACT

A computing device for a generating composite view for an intellectual property (IP) core may obtain constraints for multiple application specific integrated circuits (ASIC) designs in which the IP core is used; and determine composite constraints for the IP core based on the constraints for the multiple ASIC designs. The composite constraints may be within all constraints for the multiple ASIC designs. A freedom of change to update the particular IP core may be identified based on the composite constraints.

20 Claims, 6 Drawing Sheets

(56) References Cited

U.S. PATENT DOCUMENTS

| | | | |
|---|---|---|---|
| 2005/0251776 A1* | 11/2005 | Hsin | G06F 17/5045 716/113 |
| 2007/0256044 A1 | 11/2007 | Coryer et al. | |
| 2014/0059505 A1* | 2/2014 | Blair | G06F 17/5045 716/108 |
| 2014/0096100 A1 | 4/2014 | Sinha et al. | |

OTHER PUBLICATIONS

Engel J.J. et al., "Design Methodology for IBM ASIC Products", IBM Journal of Research and Development, Jul. 1996, pp. 387-406, vol. 40, Issue 4.

* cited by examiner

COMPOSITE VIEWS FOR IP BLOCKS IN ASIC DESIGNS

FIELD OF THE INVENTION

The invention relates to semiconductor structures and, more particularly, to processes for creating composite views identifying design constraints for intellectual property (IP) cores used in Application-Specific Integrated Circuits (ASICs).

BACKGROUND

Application-Specific Integrated Circuits (ASICs) are widely used in various computing environments. Intellectual property (IP) cores are reusable units of logic, cell, or chip layout designs that can be used as building blocks within ASIC chip designs. A particular IP core can be used in multiple different ASIC chip designs.

Semiconductor design model libraries may be developed in parallel along with IP cores, ASICs, and other technologies. When changes to design models and/or ground rules occur, IP cores may need to be correspondingly updated. Updates to an IP core can potentially cause disturbance in the development of in-flight ASICs that use the IP core. For example, updates to an IP core may necessitate the need to redesign the ASICs that use the IP core. As a result, time-to-market can be negatively impacted as a result of redesigning the ASICs.

Since different ASICs are subject to different constraints based on their applications, e.g., power constraints, temperature constraints, timing slack constraints, etc., updates to an IP core should be made with consideration to all of the different constraints for all of the ASIC designs in which the IP core is used, in order to minimize the impact to the ASIC designs. For example, if an IP core is updated with consideration to all of the different constraints for all of the ASIC designs, changes to the ASIC designs may only be minimally necessary, or may not be necessary at all.

SUMMARY

In an aspect of the invention, a method may include obtaining constraints for multiple application specific integrated circuits ASIC designs in which a particular IP core is used; determining, by a computing device, composite constraints for the particular IP core based on the constraints for the multiple ASIC designs. The composite constraints may be within all constraints for the plurality of ASIC designs. The method may further include identifying a freedom of change to update the particular IP core based on the composite constraints.

In an aspect of the invention, a computer program product for generating a composite view for an IP core product may include a computer readable storage medium having program instructions embodied therewith. The computer readable storage medium is not a transitory signal per se. The program instructions executable by a computing device may cause the computing device to perform a method including: obtaining constraints for multiple application specific integrated circuits (ASIC) designs in which the particular IP core is used; determining composite constraints for the particular IP core based on the constraints for the multiple ASIC designs. The composite constraints may be within all of the constraints for the plurality of ASIC designs. The method may further include generating the composite view for the particular IP core visually displaying the composite constraints.

In an aspect of the invention, a computer program product for generating composite views for an IP core may include a computer readable storage medium, first program instructions executable by a computing device to cause the computing device to obtain constraints for multiple ASIC designs in which the IP core is used; and second program instructions executable by the device to cause the device to determine composite constraints for the IP core based on the constraints for the multiple ASIC designs, where the composite constraints may be within all of the constraints for the plurality of ASIC designs.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The invention relates to semiconductor structures and, more particularly, to processes for creating composite views identifying design constraints for intellectual property (IP) cores used in Application-Specific Integrated Circuits (ASICs). More specifically, embodiments of the invention are directed to the generation of composite views of IP cores used within "in-flight" ASICs, e.g., ASICs that are currently in development. In embodiments, the invention may generate composite timing, physical, and/or other views for ASIC IP environments by defining a freedom of change a developer may have when updating an IP core based on all ASIC designs in which the IP core is used.

Advantageously, processes described herein provide composite views of an IP core that identify constraints for the IP core based on the constraints of all of the ASICs in which the IP core is used. The composite views identify constraints within which IP cores may be updated, thereby minimizing the impact to in-flight ASICs that use the IP cores.

As described herein, multiple composite views for a particular IP core may be generated in order to identify different types of constraints for the particular IP core. For example, a layout composite view may be generated to identify layout blockages/constraints for the particular IP core (where the layout composite view is based on layout usage/constraints of all of the ASIC designs that use the particular IP core). Similarly, a timing slack composite view may be generated to identify timing slack constraints for the particular IP core (where the timing slack composite view is based on timing slack constraints of all of the ASIC designs that use the particular IP core). Similarly, other composite views may be generated to identify other types of constraints based on the constraints of all of the ASIC designs that use the particular IP core.

Processes described herein may generate composite timing, physical, noise, power, and/or other views for ASIC IP environment by defining the freedom of change based on all ASICs that are currently being developed in which an IP core is used. In one example, a composite physical usage rule may be generated from in-flight ASICs, allowing IP developers to modify their respective IP physical information files within constraints determined from a physical layout composite view. A composite timing rule may be generated from in-flight ASICs, allowing IP developers to modify their timing library files within constraints determined from a timing composite view. The physical and timing composite views (in addition to other possible composite views), may increase the flexibility an IP developer may have when modifying IP cores, as well as minimizing the impact to in-flight ASICs.

Figure 1:
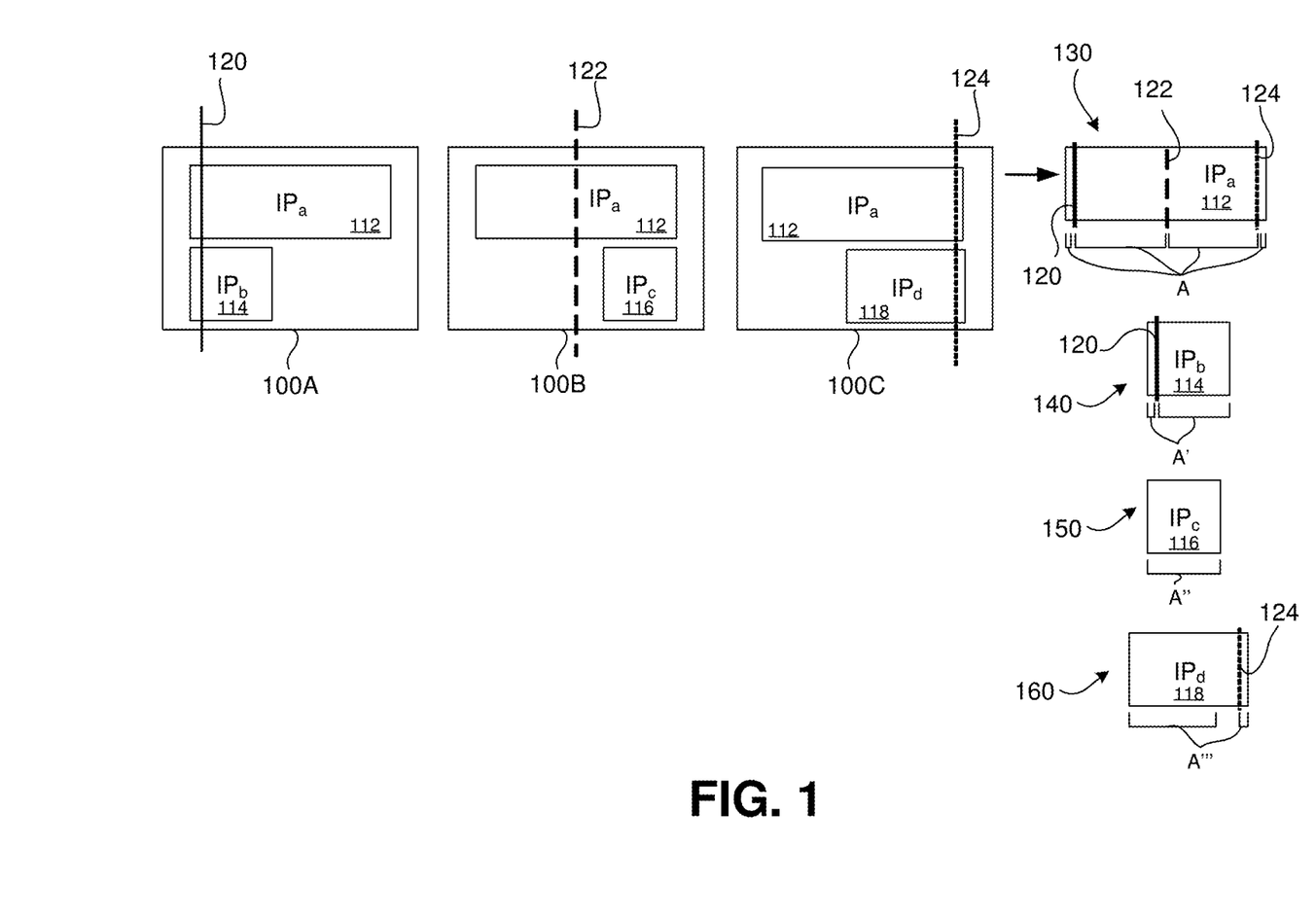
FIG. 1 shows wire layout composite views of IP cores used in ASIC designs in accordance with aspects of the invention.

FIG. 1 shows layout composite views of IP cores used in ASIC designs in accordance with aspects of the invention. As shown in FIG. 1, layouts for three example in-flight ASIC designs, e.g., design 100A, design 100B, and design 100C are used to create layout composite views of individual IP cores used within the ASIC designs, e.g., $IP_a$ 112, $IP_b$ 114, $IP_c$ 116, and $IP_d$ 118. The layouts for each ASIC design identify the layout of wires and/or other hardware to name a few representative structures. The layouts also identify circuit blockage, e.g., based on the placement of wires and/or other hardware. For example, the circuit blockages in FIG. 1 are represented by wirings 120, 122, and 124, respectively in designs 100A, 100B, and 100C. It should be understood by those of skill in the art that other layouts and resultant blockages can also be implemented with the processes described herein, and that the layouts and blockages shown in FIG. 1 are merely non-limiting illustrative examples.

The layout for each ASIC design may be based on a variety of design decisions made by an ASIC developer. For example, the layout may additionally or alternatively be determined via a place and routing analysis that is based on IP cores used within ASIC designs. Information regarding the layout for each ASIC design may be stored by one or more databases that identify the wire layouts.

As further shown in FIG. 1, a layout composite view 130 can be created for $IP_a$ 112 based on the layouts for design 100A, design 100B, and design 100C, where $IP_a$ 112 is used. More specifically, layout composite view 130 indicates the physical usage information of $IP_a$ 112 for all of the ASIC designs in which $IP_a$ 112 is present, including circuit layout blockages associated with $IP_a$ 112. That is, layout composite view 130 shows the layout constraints/blockages for all of the ASIC designs in which $IP_a$ 112 is used.

In a similar manner, layout composite views 140, 150, and 160 may be generated for $IP_b$ 114, $IP_c$ 116, and $IP_d$ 118, respectively. By way of example, layout composite view 140 indicates the physical usage information of $IP_b$ 114 for all of the ASIC designs in which $IP_b$ 114 is present, and shows circuit layout blockages associated with $IP_b$ 114. Similarly, layout composite view 150 indicates the physical usage information of $IP_c$ 116 for all of the ASIC designs in which $IP_c$ 116 is present, and shows circuit layout blockages associated with $IP_c$ 116. Moreover, layout composite view 160 indicates the physical usage information of $IP_d$ 118 for all of the ASIC designs in which $IP_d$ 118 is present, and shows circuit layout blockages associated with $IP_d$ 118.

In embodiments, the layout composite views identify a freedom of change a developer may have when modifying an IP core with respect to a certain layout. For example, when a modification is made to $IP_a$ 112, the modification can be made with consideration to layout composite view 130 for $IP_a$ 112. That is, a modification to $IP_a$ 112 may be made so as to not interfere with the current layouts for the ASIC designs in which $IP_a$ 112 is used. For $IP_a$ 112, the freedom of change is identified within brackets labeled "A."

Similarly, layout composite views can identify the freedom of change for other cores, such as cores 114, 116, and 118. For $IP_b$ 114, the freedom of change is identified within brackets "A'". For $IP_c$ 116, the freedom of change is identified within bracket "A''", and for $IP_d$ 118, the freedom of change is identified within brackets "A'''". Thus, the layout composite views easily identify the flexibility an IP developer has to modify an IP core without impacting ASIC designs in which the IP core is used.

Figure 2:
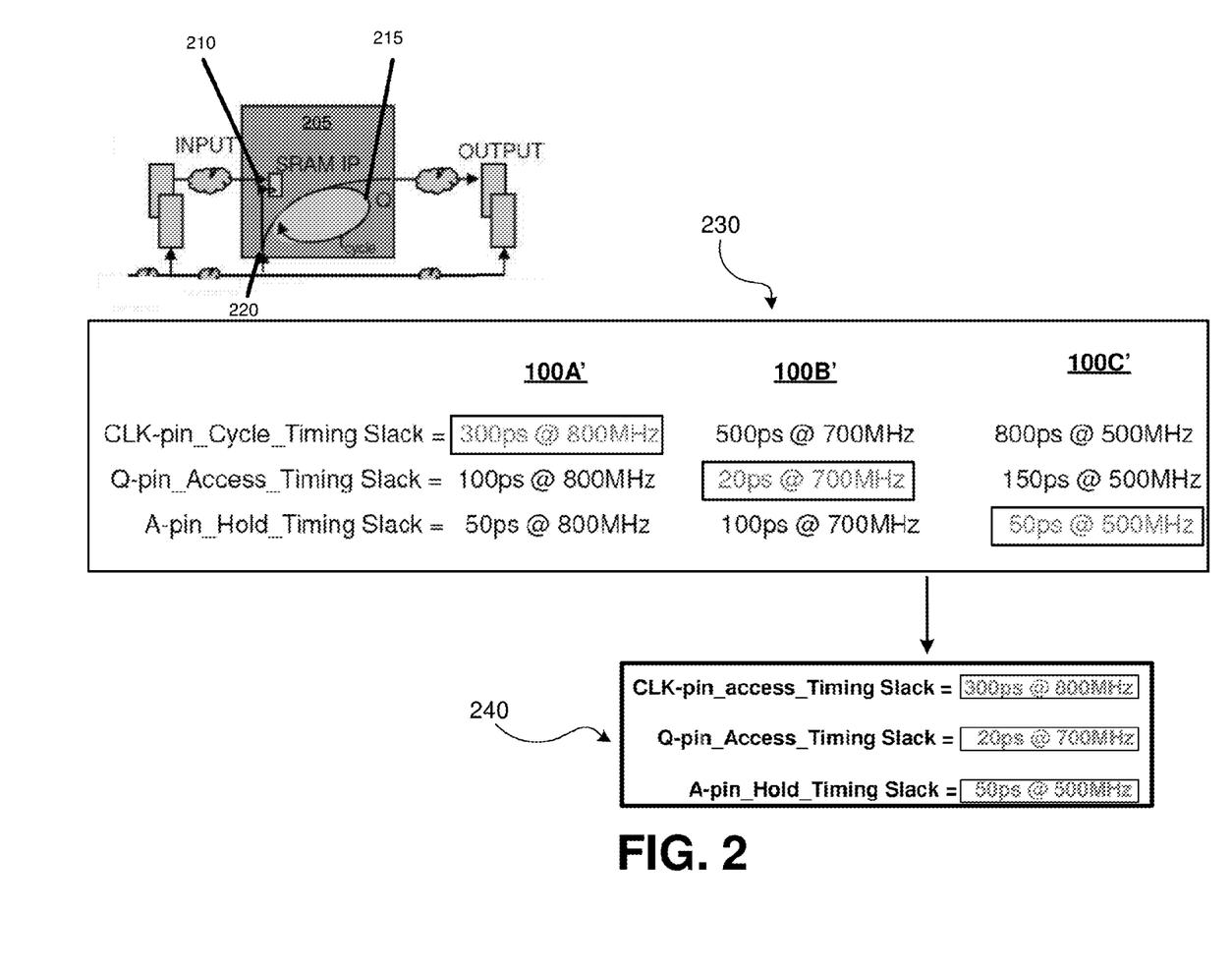
FIG. 2 shows a composite timing view of a particular IP core in accordance with aspects of the invention.

FIG. 2 shows a composite timing view of a particular example IP core in accordance with aspects of the invention. In FIG. 2, timing slack information for three example ASIC designs, e.g., design 100A,' 100B,' and 100C,' in which an example IP core, e.g., static random access memory (SRAM) IP 205, is present, is summarized in table 230. By way of illustrative example, table 230 identifies three example maximum timing slack constrains for each of design 100A,' 100B,' and 100C.' The timing slack constraints for each ASIC design may be based on a variety of design decisions made by an ASIC developer. The timing slack constraints may additionally or alternatively be determined based on timing closure processes. The timing slack constraints for each design may be stored by one or more databases.

As shown in the example of FIG. 2, table 230 identifies CLK-pin_Cycle_Timing Slacks, Q-pin_Access_Timing Slacks, and A-pin_Hold_Timing Slacks for each design 100A,' 100B,' and 100C.' As an example, CLK-pin_Cycle_Timing slack may refer to a cycle timing slack associated with connection 220. The Q-pin_Access_Timing Slack may refer to an access timing slack associated with connection 215. The A-pin_Hold_Timing Slack may refer to a hold timing slack associated with connection 210. In practice, other timing slack constraints at different connections may be identified.

As further shown in FIG. 2, the strictest, e.g., lowest values, of the timing slacks in table 230 are identified in boxes. For example, table 230 identifies the strictest CLK-pin_Cycle_Timing Slack of 300 picoseconds (ps) at 800 megahertz (MHz), the strictest Q-pin_Access_Timing Slack of 20 ps at 700 MHz, and the strictest A-pin_Hold_Timing Slack of 50 ps at 500 MHz. A composite timing view 240 for SRAM IP 205 is generated based on the strictest timing slacks across all ASIC designs in which SRAM IP 205 is used. The composite timing view 240 identifies "composite timing constraints" that correspond to the strictest timing slacks. In other words, the composite timing constraints for SRAM IP 205 are all within the timing constraints across ASIC designs 100A,' 100B,' and 100C.'

By way of illustrative example, composite timing view 240 identifies the strictest, e.g., lowest value, CLK-pin_Cycle_Timing Slack, Q-pin_Access_Timing Slacks, and A-pin_Hold_Timing Slack across all ASIC designs in which SRAM IP 205 is used. Information in composite timing view 240 may be used to identify a freedom of change a developer may have when modifying SRAM IP 205, with respect to timing slacks, e.g., an amount that the timing slacks can be relaxed without adversely impacting ASIC designs. By using composite timing view 240, impacts to ASIC designs in which SRAM IP 205 is used may be minimized when modifications to SRAM IP 205 are made. More specifically, any impact may be minimized by remaining within the timing slack constraints identified in composite timing view 240.

As a particular illustrative example, the CLK-pin_Cycle_Timing Slack may be set up to 300 ps at 800 megahertz (MHz), the Q-pin_Access_Timing Slack may be set up to 20 ps at 700 MHz, and the A-pin_Hold_Timing Slack may be set up to 50 ps at 500 MHz, without adversely impacting design 100A', design 100B', or design 100C.' Thus, assuming the CLK-pin_Cycle_Timing Slack is currently set to 200 ps at 800 MHz, the designer can readily determine that CLK-pin_Cycle_Timing Slack can be relaxed from 200 ps up to 300 ps at 800 MHz, by implementing the processes described herein.

Figure 3:
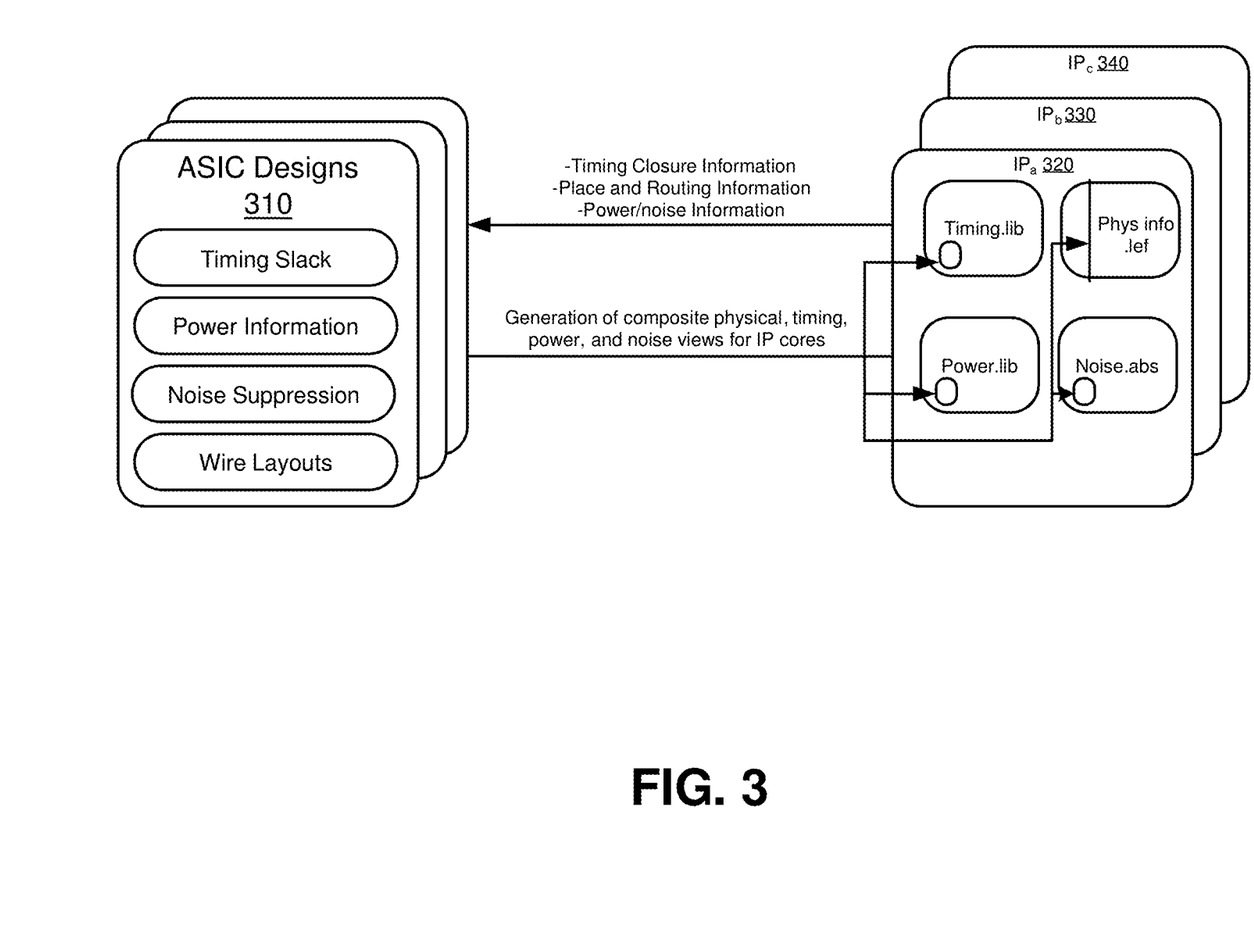
FIG. 3 shows a block diagram of updating and generating composite views of IP cores in accordance with aspects of the invention.

FIG. 3 shows a block diagram showing updating and generation of composite views of IP cores in accordance with aspects of the invention. In FIG. 3, example IP cores, e.g., $IP_a$ 320, $IP_b$ 330, and $IP_c$ 340 may each include a timing library file, e.g., "timing.lib", a power library file, e.g., "power.lib", a noise abstract file, e.g., "noise.abs", and/or a physical information file, e.g., "phys info.lef". In embodiments, the timing library file may identify timing constraints, such as maximum timing slacks as described above with respect to FIG. 2. The power library file may identify power constraints, such as maximum voltages, and the noise abstract file may identify noise constraints and/or noise coupling/suppression information. Moreover, the physical information file may identify layouts and/or other physical constraints, e.g., as described with respect to FIG. 1.

In embodiments, the files shown in FIG. 3 may be used to perform a timing closure analysis, a place and routing analysis, and/or a power/noise analysis in accordance with aspects of the present invention. Information from these analyses may be output to an ASIC design information database that stores information for ASIC designs 310 and used to identify timing slack constraints, power constraints, noise suppression constraints, layout blockages, and/or other constraints for ASIC designs 310. The database may also store information identifying which IP cores are used in which ASIC designs.

In embodiments, the constraints for each ASIC design 310 may be used to generate composite views for IP cores used in different ASIC designs, e.g., physical/layout composite views, timing composite views, power composite views, noise composite views, etc. As described, the composite views may summarize the composite constraints for a particular IP core, and may indicate a level of freedom an IP developer may have when updating IP designs and rules.

Information from the composite views for a particular IP core may be used to update the files associated with the IP core. For example, information in a composite timing view may be used to update timing constraints identified in the "timing.lib" file. Similarly, information in a power composite view may be used to update power constraints identified in the "power.lib" file. Information in a physical composite view may be used to update the "physical info.lef" file, and information in a noise composite view may be used to update the "noise.abs" file.

When an update to an IP core is made, information associated with the update may be provided to a database storing information for ASIC designs 310. This updated information may be used to generate updated composite views for IP cores used in ASIC designs 310. Information from the updated composite views may then be fed back to the IP cores, where the individual libraries and files for the IP cores may be updated.

Figure 4:
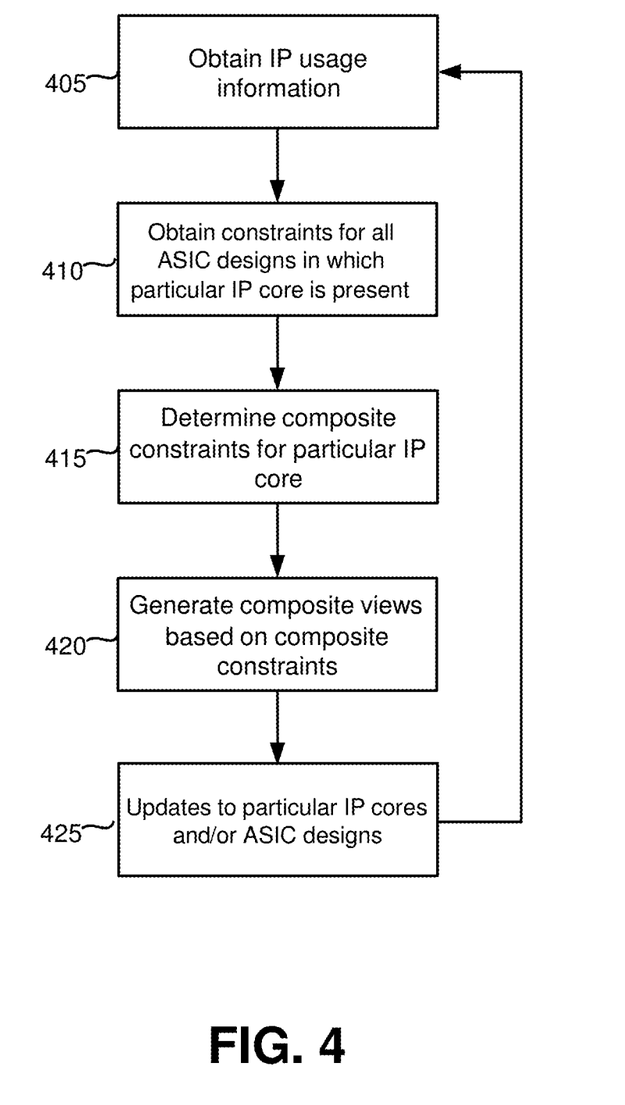
FIG. 4 shows a flow diagram of updating and generating composite views of IP cores in accordance with aspects of the invention.
Figure 5:
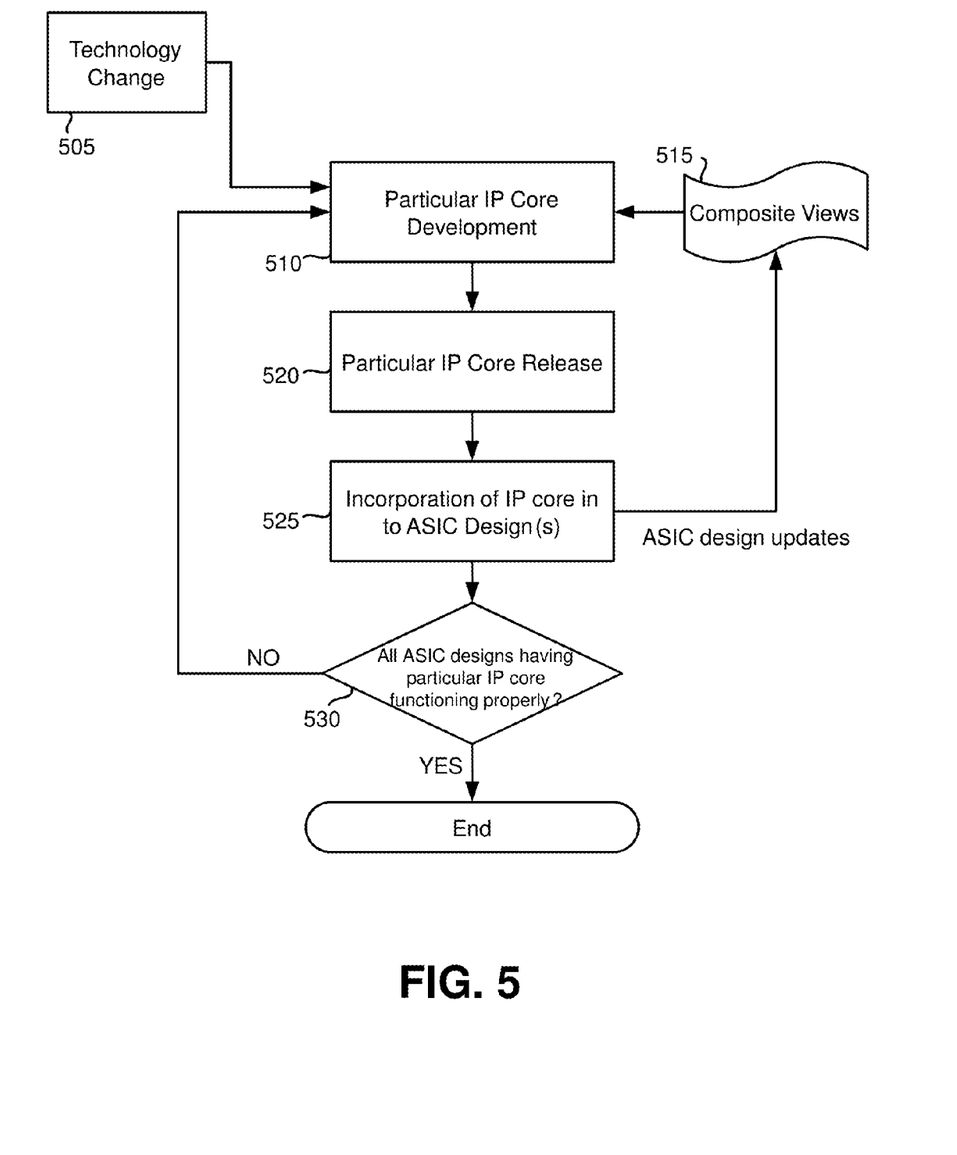
FIG. 5 shows a flow diagram of an example process for developing IP cores based on composite views of the IP cores in accordance with aspects of the invention.

FIGS. 4 and 5 show flow diagrams of processes in accordance with aspects of the present invention. The flowchart and block diagrams in FIGS. 4 and 5 illustrate the architecture, functionality, and operation of possible implementations of systems, methods, and computer program products according to various embodiments of the present invention. In this regard, each block in the flowchart may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustration, and combinations of blocks in the flowchart illustration, can be implemented by special purpose hardware-based systems that perform the specified functions or acts or carry out combinations of special purpose hardware and computer instructions. The process described herein can be implemented as a computer program product which may include a computer readable storage medium (or media) having computer readable program instructions thereon for causing a processor to carry out aspects of the invention. The computer readable storage medium is any physical storage medium or device and should not be interpreted as a non-transitory signal, per se.

In particular, FIG. 4 shows a process for generating and outputting composite views for a particular IP core. At step 405, IP usage information may be obtained, e.g., from a database. The IP usage information may identify ASIC designs in which the particular IP core is present. As an example, the IP usage information may identify that a particular IP core, e.g., $IP_a$, is used in different ASIC designs, e.g., design A, design B, and design C.

At step 410, the constraints for all ASIC designs in which the particular IP core, e.g., $IP_a$, is present may be obtained. For example, the constraints for the ASIC designs identified at step 405, e.g., design A, design B, and design C, may be obtained. In embodiments, various constraints may be obtained, such as, e.g., noise constraints, power constraints, temperature constraints, layout blockages/constraints, and/or other constraints for each ASIC design.

At step 415, composite constraints for the particular IP core, e.g., $IP_a$, may be determined. In embodiments, the composite constraints may be determined by compiling the constraints across all of the ASIC designs in which the particular IP core is used. The "composite constraints" may identify a freedom of change an IP developer may have, without substantially impacting the ASIC designs in which the particular IP core is used. The composite constraints may include constraints for the particular IP core that are within all of the constraints across all of the ASIC designs in which the particular IP core is used.

As an example, a "composite layout constraint" may be determined by compiling the union of layout blockages/constraints for design A, design B, and design C. Additionally or alternatively, a "composite timing constraint" value may also be generated based on the strictest timing constraints across design A, design B, and design C. Additionally or alternatively, a "power composite constraint" value may be determined by compiling the power constraints of design A, design B, and design C. For example, the power composite constraint value may be determined based on the strictest power constraints across design A, design B, and design C. Additionally or alternatively, a "noise composite constraint" may be determined by compiling the noise constraints of design A, design B, and design C. For example, the noise composite constraint value may be based on the strictest noise constraints across design A, design B, and design C. In embodiments, the additional composite constraints may be determined.

At step 420, composite views may be generated based on the composite constraints. For example, a report, a table, or diagram that identifies the composite constraints for the particular IP core may be generated.

In embodiments, information identified in the composite views may be outputted so that the libraries and/or other files for the particular IP core can be updated to reflect the constraints identified in the composite views. As an example, a composite layout diagram may be generated identifying layout blockages for the particular IP core, e.g., as shown in FIG. 1. Additionally, or alternatively, a composite timing table may be generated identifying maximum timing slack values for the particular IP core, e.g., as shown in FIG. 2. Additionally, or alternatively, a power composite view may be generated identifying power composite constraint values. Additionally, or alternatively, a noise composite view may be generated identifying noise composite constraint values.

At step 425, the composite views may be used, e.g., by a developer of the particular IP core to update the particular IP core within the constraints identified in the composite views. In embodiments, ASIC designs may also be updated to reflect corresponding IP core changes. Information regarding updates to IP cores and/or ASICs may be used to update the composite views. In embodiments, the process of FIG. 4 may be repeated for additional IP cores.

FIG. 5 shows a flow diagram of an example process for developing and updating an IP core based on composite views of the IP core in accordance with aspects of the invention. At step 505, a technology change may initiate an IP core development process. For example, a technology change may refer to any change in an overall design that uses various ASICs, e.g., ground rules, customer requirements, design models, etc.

At step 510, a particular IP core may be developed, e.g., from scratch or updated from an existing IP core, based on the technology change. The development can be based on composite views 515 associated with the particular IP core. For example, the development of the particular IP core may take into account the constraints identified in the composite views. As described herein, corresponding files associated with the particular IP core, e.g., timing.lib, power.lib, noise.abs, physical information.lef, etc., may be updated to reflect the constraints in the composite views, e.g., timing constraints in the timing.lib file may be relaxed up to the constraints in the timing composite view.

At step 520, a particular IP core may be released, and at step 525, the particular IP core may be incorporated into one or more ASIC designs. Once incorporated, any updates that may need to be made to ASIC designs, e.g., as a result of updates to the particular IP core may be used to update composite views 515. For example, wiring layouts may be updated for ASIC designs based on an update to the particular IP core. As another example, timing constraints may be updated if the particular IP core is unable to meet the constraints identified in the composite views.

The updates to the ASIC designs may be used to update composite views for other IP cores. As a result, composite views 515 may be periodically updated as changes to IP cores and/or ASIC designs are made.

Also, once the particular IP core has been incorporated into ASIC designs, a determination may be made, at step 530, as to whether all the ASIC designs in which the particular IP core is used, are functioning properly, e.g., within normal operating parameters. If, for example, all the ASIC designs are functioning properly (step 530—YES), the IP development process may be completed until another technology change is made (at step 505). If, on the other hand, the ASIC designs are not functioning properly (step 530—NO), the development process may revert back to step 510, where the IP core may be re-developed or updated based on the most up-to-date composite views 515.

As described herein, the composite views for a particular IP core may assist an IP developer to identify how much freedom the IP developer may have to update designs and rules associated with the particular IP core. The composite views can be visually presented in a diagram, such as in FIG. 1. Additionally or alternatively, the composite views can be presented as a table. Based on the composite views, the IP developer may manually update various files in the IP core to reflect the constraints identified by the composite views.

Figure 6:
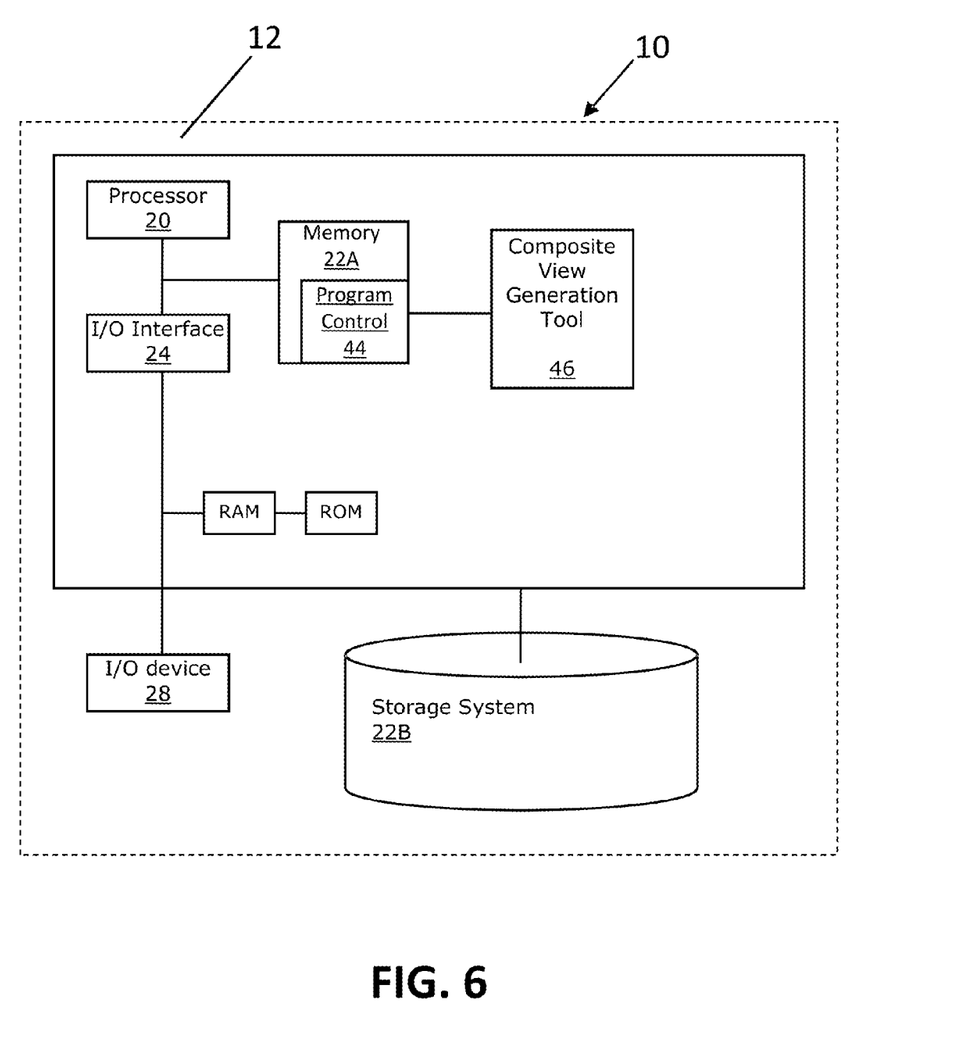
FIG. 6 shows an illustrative environment for implementing the steps in accordance with aspects of the invention.

FIG. 6 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 6).

The computing device 14 includes a processor 20, e.g., CPU, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14, e.g., user interface, or any device that enables computing device 14 to communicate with one or more other computing devices using any type of communications link. The external I/O device/resource 28 may be for example, a handheld device, PDA, handset, keyboard etc.

In general, processor 20 executes computer program code, e.g., program control 44, which can be stored in memory 22A and/or storage system 22B. Moreover, in accordance with aspects of the invention, program control 44 controls a composite view generation program tool 46, e.g., the processes described herein. For example, composite view generation program tool 46 can implement the process flows of FIGS. 4 and 5, as well as present the visual representation of FIG. 1, and the generation of reports, tables, etc. shown in FIG. 2. The composite view generation program tool 46 can be implemented as one or more program code in program control 44 stored in memory 22A as separate or combined modules. Additionally, the composite view generation program tool 46 may be implemented as separate dedicated processors or a single or several processors to provide the function of these tools. While executing the computer program code, the processor 20 can read and/or write data to/from memory 22A, storage system 22B, and/or I/O interface 24. Storage system 22B can be the database which stores the information for the IP cores and/or ASIC designs, etc. as described herein. The program code executes the processes of the invention, which can be provided as a computer program product stored on the computer readable storage medium. The bus 26 provides a communications link between each of the components in computing device 14.

The computing device 14 can comprise any general purpose computing article of manufacture capable of executing computer program code installed thereon, e.g., a personal computer, server, etc. However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices, e.g., a server cluster, that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks, e.g., the Internet, a wide area network, a local area network, a virtual private network, etc.; and/or utilize any combination of transmission techniques and protocols.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
   obtaining constraints for a plurality of application specific integrated circuits (ASIC) designs in which a particular IP core is used;
   determining, by a computing device, composite constraints for the particular IP core based on the constraints for the plurality of ASIC designs, the composite constraints being within all constraints for the plurality of ASIC designs; and
   identifying, by the computing device, a freedom of change to update the particular IP core based on the composite constraints.

2. The method of claim 1, further comprising obtaining information identifying the ASIC designs in which the particular IP core is used, the information being used to obtain the constraints.

3. The method of claim 1, wherein updates to the particular IP core within the composite constraints minimize impact to the plurality of ASIC designs.

4. The method of claim 1, wherein the composite constraints include at least one of: a layout composite constraint, a timing composite constraint, a power composite constraint, and a noise composite constraint.

5. The method of claim 4, further comprising identifying all circuit layout blockages associated with the plurality of ASIC designs, the circuit layout blockages corresponding to the layout composite constraint.

6. The method of claim 4, wherein the timing composite constraint identifies a maximum timing slack value that is within all timing constraints associated with the plurality of ASIC designs.

7. The method of claim 4, wherein the power composite constraint identifies a maximum power value that is within all power constraints associated with the plurality of ASIC designs.

8. The method of claim 4, wherein the noise composite constraint identifies a maximum noise value that is within all noise constraints associated with the plurality of ASIC designs.

9. The method of claim 1, further comprising updating a file associated with the particular IP core based on information regarding the composite constraints.

10. The method of claim 9, wherein the file includes at least one of: a timing library, a power library, a noise abstract file, and a physical information file.

11. The method claim 9, further comprising performing at least one of: a timing closure process, a power analysis, a noise analysis, and place and routing analysis using the file.

12. A computer program product for generating a composite view for an intellectual property (IP) core, the computer program product comprising a non-transitory computer readable storage medium having program instructions embodied therewith, wherein the computer readable storage medium is not a transitory signal per se, the program instructions executable by a computing device to cause the computing device to perform a method comprising:
   obtaining constraints for a plurality of application specific integrated circuits (ASIC) designs in which the IP core is used;
   determining composite constraints for the IP core based on the constraints for the plurality of ASIC designs, the composite constraints being within all of the constraints for the plurality of ASIC designs; and generating the composite view for the IP core visually displaying the composite constraints.

13. The computer program product of claim 12, wherein the composite view identifies a freedom of change to update the particular IP core.

14. The computer program product of claim 12, wherein the composite view includes at least one of: a layout composite view, a timing composite view, a power composite view, and a noise composite view.

15. The computer program product of claim 14, wherein the layout composite view illustrates all circuit layout blockages associated with the plurality of ASIC designs.

16. The computer program product of claim 14, wherein the timing composite view illustrates a maximum timing slack value that is within all timing constraints associated with the plurality of ASIC designs.

17. The computer program product of claim 14, wherein the power composite view illustrates a maximum power value that is within all power constraints associated with the plurality of ASIC designs.

18. The computer program product of claim 14, wherein the noise composite view illustrates a maximum noise value that is within all noise constraints associated with the plurality of ASIC designs.

19. A computer program product for generating composite views for an intellectual property (IP) core, said computer program product comprising:
  a non-transitory computer readable storage medium:
  first program instructions executable by a computing device to cause the computing device to obtain constraints for a plurality of application specific integrated circuits (ASIC) designs in which the IP core is used; and
  second program instructions executable by the computing device to cause the computing device to determine composite constraints for the IP core based on the constraints for the plurality of ASIC designs, the composite constraints being within all of the constraints for the plurality of ASIC designs.

20. The computer program product of claim 19, wherein the file includes at least one of: a timing library, a power library, a noise abstract file, and a physical information file.

* * * * *